United States Patent
Hong et al.

(10) Patent No.: US 7,759,405 B2
(45) Date of Patent: Jul. 20, 2010

(54) LOW VISCOSITY MULTI-FUNCTIONAL URETHANE ACRYLATE OLIGOMER-CONTAINING HIGH SOLID UV CURABLE COATING COMPOSITION

(75) Inventors: Su Dong Hong, Gunpo-si (KR); Dong Soo Kim, Suwon-si (KR); Tae Yun Jeong, Ansan-si (KR); Sang Hwan Kim, Gunpo-si (KR); Jung Hyun Oh, Pusan (KR)

(73) Assignee: SSCP Co. Ltd. (KR)

( * ) Notice: Subject to any disclaimer, the term of this patent is extended or adjusted under 35 U.S.C. 154(b) by 117 days.

(21) Appl. No.: 12/088,534

(22) PCT Filed: Feb. 7, 2006

(86) PCT No.: PCT/KR2006/000438

§ 371 (c)(1),
(2), (4) Date: Mar. 28, 2008

(87) PCT Pub. No.: WO2007/043728

PCT Pub. Date: Apr. 19, 2007

(65) Prior Publication Data

US 2008/0255264 A1    Oct. 16, 2008

(30) Foreign Application Priority Data

Oct. 10, 2005   (KR) .................... 10-2005-0094972

(51) Int. Cl.
*C08F 2/46*        (2006.01)
(52) U.S. Cl. ......................... 522/79; 522/96; 522/173
(58) Field of Classification Search ................ 522/79, 522/173, 96
See application file for complete search history.

(56) References Cited

U.S. PATENT DOCUMENTS

| | | | | |
|---|---|---|---|---|
| 6,110,988 | A | * | 8/2000 | Lake ............................ 522/75 |
| 6,140,386 | A | * | 10/2000 | Vanderhoff et al. ............ 522/78 |
| 7,514,138 | B2 | * | 4/2009 | Ariga et al. ............... 428/195.1 |
| 2004/0091632 | A1 | * | 5/2004 | Matsunami et al. ......... 427/457 |
| 2009/0012198 | A1 | * | 1/2009 | Araumi et al. ................ 522/35 |

* cited by examiner

*Primary Examiner*—Susan W Berman
(74) *Attorney, Agent, or Firm*—Baker + Hostetler, LLP

(57) ABSTRACT

A high-solid UV-curable coating composition of the present invention, comprising a low viscosity multifunctional urethane acrylate oligomer, a UV-curable monomer, 10% by weight or less of an organic solvent and a photoinitiator has good workability and environmental characteristics and provides a coating film having improved properties including thermal shock resistance.

12 Claims, No Drawings

LOW VISCOSITY MULTI-FUNCTIONAL URETHANE ACRYLATE OLIGOMER-CONTAINING HIGH SOLID UV CURABLE COATING COMPOSITION

FIELD OF THE INVENTION

The present invention relates to a UV-curable coating composition comprising a low viscosity multi-functional urethane acrylate oligomer, which provides a good coating film without causing environmental or processability problems.

BACKGROUND OF THE INVENTION

There have been developed various coating compositions such as powder-coating, water-born coating, UV-curable-coating, and high-solid coating compositions, among which UV-curable coating compositions have been widely employed. However, a typical UV-curable composition contains a large quantity, e.g., 45 to 60% by weight of a volatile organic solvent, and when used for spray coating, dip coating, flow coating or spin coating, it causes air pollution, worker's health problem, deformation of the coated substrate, and ineffective energy use.

Thus, there has been a need to develop an environment-friendly UV-curable composition which can minimize problems earned by the use of volatile organic compounds.

SUMMARY OF THE INVENTION

Accordingly, it is a primary object of the present invention to provide a high-solid UV-curable coating composition containing a low viscosity multi-functional urethane acrylate oligomer and 10% by weight or less of an organic solvent, which exhibits improved workability and environmental acceptability in obtaining a coating film having improved properties.

In accordance with one aspect of the present invention, there is provided a UV-curable coating composition comprising (A) 20 to 60% by weight of a urethane acrylate oligomer, (B) 20 to 60% by weight of a UV-curable monomer, (C) 1 to 10% by weight of an organic solvent, and (D) 1 to 10% by weight of a photoinitiator based on the total weight of the composition, wherein the urethane acrylate oligomer has 6 to 9 functional acrylate groups and exhibits a viscosity of 500 to 30,000 cps (centipoise) at room temperature.

DETAILED DESCRIPTION OF THE INVENTION

The high-solid UV-curable coating composition of the present invention is characterized by comprising a multifunctional urethane acrylate oligomer (A) having a low viscosity at room temperature and 10% by weight of less of an organic solvent.

In the present invention, the multifunctional urethane acrylate oligomer (A) preferably has 6 to 9 functional acrylate groups and exhibits a viscosity of 500 to 30,000 cps at room temperature.

The multifunctional urethane acrylate oligomer (A) used in the present invention is obtained by reacting a polyisocyanate having three or more isocyanate groups with an acrylate having one or more hydroxyl groups and three or more acryl groups in the presence of a metallic catalyst and a radical polymerization inhibitor. The reaction is carried out at 50 to 80° C. until the isocyanate (NCO) group is not observed. The acrylate may be used in an amount of 1 to 1.2 eq. based on the 1 eq. of the polyisocyanate.

Representative examples of the polyisocyanate used in the present invention include 1,6-hexamethylene diisocyanate trimer, 1,6-hexamethylene diisocynate biuret, 1,6-hexamethylene disocynate allophanate and the like.

Representative examples of the acrylate used in the present invention include a mixture of pentaerythritol triacrylate and pentaerythritol tetraacrylate, a mixture of dipentaerythritol pentaacrylate and dipentaerythritol hexaacrylate and the like, preferably a mixture of pentaerythritol triacrylate and pentaerythritol tetraacrylate.

The mixture of pentaerythritol triacrylate and pentaerythritol tetraacrylate preferably has a high purity and a content of pentaerythritol triacrylate of 50 to 60% by weight because a trace amount of oligomer as an impurity generated in the synthesis procedure influences the viscosity of the multifunctional urethane acrylate oligomer Representative examples of the metallic catalyst used in the reaction include a tin-based compound such as dibutyltin dilaurylate and an amine compound such as DBU(1,8-diazabicyclo[5,4,0]undec-7-ene) and the like, and the metallic catalyst may be used in a catalytically effective amount, preferably in an amount of 100 to 500 ppm.

Representative examples of the radical polymerization inhibitor used in the present invention include hydroquinone, p-methoxyphenol, nitrobenzene, BHT(2,6-di-tetra-butyl-4-methylphenol) and the like, and the polymerization inhibitor may be used in an effective amount, preferably in an amount of 100 to 500 ppm.

In order to control the viscosity of the urethane acrylate oligomer resulted from the above reaction, a diluent may be further used in the reaction. Representative examples of the diluent include an organic solvent such as methyl isobutyl ketone, methyl ethyl ketone, dimethyl ketone, ethyl actate and n-butyl acetate, or a non-reactive UV-curable monomer without hydroxy group such as hexamethylene diacrylate (HDDA) or isobonyl acrylate (IBOA). In order not to cause environmental and processability problems, the organic solvent is preferably used in an amount of 10% by weight or less and the UV-curable monomer is preferably used in an amount of 30% by weight or less.

To the resulting low viscosity multifunctional urethane acrylate oligomer, a UV-curable monomer (B), an organic solvent (C) and a photoinitiator (B) are added to obtain the inventive high-solid UV-curable coating composition.

In the present invention, the low viscosity multifunctional urethane acrylate oligomer (A) is used in an amount ranging from 20 to 60% by weight, preferably from 30 to 40% by weight based on the total weight of the composition. When the amount is more than 60% by weight, the cured coating film becomes brittle due to an excessively high crosslinking density and suffers from crack generation by heat or impact, and when less than 20% by weight, mechanical properties such as hardness and anti-abrasion of the coating film become poor.

Representative examples of the UV-curable monomer (B) used in the present invention, which acts to control the viscosity of the oligomer as a reactive diluent, include pentaerythritol tri/tetraacrylate (PETA), trimethylolpropane triacrylate (TMPTA), hexamethylene diacrylate (HDDA), 2-hydroxyethyl acrylate (2-HEA), 2-hydroxypropyl acrylate (2-HPA), 2-hydroxybutyl acrylate (2-HBA), isobonyl acrylate (IBOA) and the like. The monomer may be used in an amount ranging from 20 to 60% by weight, preferably from 25 to 55% by weight based on the total weight of the composition. When the amount is more than 60% by weight, the curing rate becomes low, and mechanical and chemical properties of the coating film become poor, and when less than 20% by weight, the workability and leveling ability deteriorate.

Representative examples of the organic solvent (C) used in the present invention include methyl isobutyl ketone, methyl ethyl ketone, dimethyl ketone, isopropyl alcohol, isobutyl alcohol, normal butyl alcohol, ethyl acetate, normal butyl acetate, ethyl cellosolve, butyl cellosolve and the like. The organic solvent is used in an amount ranging from 1 to 10% by weight, preferably from 5 to 10% by weight based on the total weight of the composition. When the amount is more than 10% by weight, the desired effect expected by reducing the amount of the volatile organic compound is not accomplished, and when less than 1% by weight, effective blending cannot be formed.

The composition of the present invention comprises a photoinitiator (D) which functions to generate radicals by UV to initiate the crosslinking of unsaturated hydrocarbons. Representative examples of the photoinitiator include 1-hydroxycyclohexyl phenyl ketone (IRGACURE 184), bis(2,4,6-trimethyl benzoyl)phenyl phosphine oxide (IRGACURE 819), 2,4,6-trimethylbenzoyl diphenyl phosphine (TPO), 2-hydroxy-2-methyl-1-phenyl-1-propane (DAROCUR 1173), benzophenone (BP) and the like, and it is used in an amount ranging from 1 to 10% by weight, preferably from 4 to 7% by weight based on the total weight of the composition.

In order to enhance the slip and gloss characteristics of the coating film, the inventive coating composition may further comprise a leveling agent in an amount ranging from 0.1 to 2% by weight based on the total weight of the composition, the leveling agent being any of the conventional materials used in the coating composition, preferably polysiloxan, e.g., BYK-300, BYK-333 (commercially available from BYK chemie Co.), and TEGO RAD 2200N (available from Tego chemie Co.).

In addition, so as to enhance the property of the coating film, the inventive coating composition may further comprise additives such as XP-1045, XP-0596 and XP-0746 (commercially available from hanse chemie Co.) in an amount ranging from 0.1 to 2% by weight based on the total weight of the composition.

The inventive composition may be prepared by mixing the low viscosity multifunctional UV-curable oligomer, UV-curable monomer and organic solvent in suitable amounts and adding thereto the photoinitiator, as well as the optional leveling agent and other additives, with stirring.

In accordance with the present invention, the coating film may be prepared by spray coating, dip coating, flow coating or spin coating the inventive composition on the surface of a substrate to form a UV-curable film thereon, drying the UV-curable film at room temperature and curing the dried film by means of UV irradiation. When a spray coating method is employed, it is desirable to dry the coated film at room temperature for 1 to 2 min.

The coating film may have a thickness ranging from 5 to 50 μm, and have improved properties in term of adhesion, pencil hardness, gloss and moisture-, chemical-, abrasion- and acid-resistance as well as thermal shock resistance.

As described above, the inventive UV-curable coating composition containing a very small quantity of the organic solvent has good workability and acceptable environmental characteristics, and is capable of providing a coating film having improved properties. Accordingly, it is useful for the coating of products such as mobile phones, automobiles and electronic appliances.

The following Examples and Comparative Examples are given for the purpose of illustration only and are not intended to limit the scope of the invention.

EXAMPLE

Preparation of Low Viscosity Multifunctional Urethane Acrylate Oligomer

Preparation Example 1

500 g of a mixture of pentaerythritol tetraacrylate and pentaerythritol triacrylate containing 50 to 55% by weight of pentaerythritol triacrylate was added to a 4-neck round bottom flask, and 200 ppm of p-methoxy phenol as a polymerization inhibitor was added thereto. After stirring the resulting mixture for 30 min at room temperature, 100 ppm of dibutyltindilaurylate was added thereto, and the mixture was heated to 70° C. 1 eq. of 1,6-hexamethylene diisocyanate trimer (TKA-100P, Aasahi kasei) was added dropwise thereto and the resulting mixture was reacted for 5 hours. After confirming that the isocyanate group was disappeared by infrared spectrophotometer, the resulting mixture was cooled to 50° C. and 10% by weight of methyl isobutyl ketone based on the total weight of the composition was added to the resulting mixture to obtain a low viscosity multifunctional urethane acrylate oligomer having a viscosity of 13,000 cps (Brookfield DV-II) at 25° C.

Preparation Example 2

The procedure of Preparation 1 was repeated except for using 15% by weight of isobony acrylate based on the total weight of the composition instead of methyl isobutyl ketone as a diluent to obtain a low viscosity multifunctional urethane acrylate oligomer having a viscosity of 28,000 cps at 25° C.

Preparation Example 3

The procedure of Preparation 1 was repeated except for using HA 100 (Basf Co.) as 1,6-hexamethylene diisocyanate allophanate instead of 1,6-hexamethylene diisocyanate trimer and 5% by weight of methyl isobutyl ketone based on the total weight of the composition to obtain a low viscosity multifunctional urethane acrylate oligomer having a viscosity of 23,000 cps at 25° C.

Preparation Example 4

The procedure of Preparation 3 was repeated except for using 15% by weight of isobonyl acrylate instead of methyl isobutyl ketone as a diluent to obtain a low viscosity multifunctional urethane acrylate oligomer having a viscosity of 15,000 cps at 25° C.

Preparation Example 5

The procedure of Preparation 3 was repeated except for using HA 200 (Basf Co.) instead of HA 100 (Basf Co.) as 1,6-hexamethylene diisocyanate allophanate to obtain a low viscosity multifunctional urethane acrylate oligomer having a viscosity of 18,000 cps at 25° C.

Preparation Example 6

The procedure of Preparation 5 was repeated except for using 15% by weight of isobonyl acrylate based on the total weight of the composition instead of methyl isobutyl ketone as a diluent to obtain a low viscosity multifunctional urethane acrylate oligomer having a viscosity of 10,000 cps at 25° C.

Preparation Example 7

The procedure of Preparation 3 was repeated except for using HA 300 (Basf Co.) instead of HA 100 (Basf Co.) as 1,6-hexamethylene diisocyanate allophanate to obtain a low viscosity multifunctional urethane acrylate oligomer having a viscosity of 13,000 cps at 25° C.

Preparation Example 8

The procedure of Preparation 7 was repeated without diluent to obtain a low viscosity multifunctional urethane acrylate oligomer having a viscosity of 45,000 cps at 25° C.

Preparation of UV-Curable Coating Composition

Example 1

30% by weight of the low viscosity multifunctional urethane acrylate obtained in Preparation Example 1, 18% by weight of trimethylolpropane triacrylate, 10% by weight of hexamethylendiol diacrylate, 17.5% by weight of 2-hydroxypropyl acrylate and 11% by weight of isobonyl acrylate were added to a mixture of 5% by weight of isobutyl alcohol and 2% by weight of dimethyl ketone while stirring. Then, 6% by weight of DAROCUR 1173 (CIBA-GEIGY) as a photoinitiator and 0.5% by weight of BYK-333 (BYK chemie) as a leveling agent were added thereto, and the resulting mixture was stirred for 20 min, to obtain a high-solid UV-curable coating composition (non-volatile content, 90 wt %), Here, the percentage values of the components are based on the weight of the final composition Example 2

The procedure of Example 1 was repeated except for using 30% by weight of the low viscosity multifunctional urethane acrylate obtained in Preparation Example 3, 6% by weight of isobutyl alcohol and 2.5% by weight of dimethyl ketone to obtain a high-solid UV-curable coating composition (non-volatile content, 91.5 wt %).

Example 3

The procedure of Example 2 was repeated except for using 30% by weight of the low viscosity multifunctional urethane acrylate obtained in Preparation Example 5 to obtain a high-solid UV-curable coating composition (non-volatile content, 91.5 wt %).

Example 4

The procedure of Example 2 was repeated except for using 30% by weight of the low viscosity multifunctional urethane acrylate obtained in Preparation Example 7 to obtain a high-solid UV-curable coating composition (non-volatile content, 91.5 wt %).

Comparative Example 1

In accordance with the composition of a conventional UV-curable coating composition, 15% by weight of urethane acrylate oligomer (EBECRYL 1290, UCB, Belgium) having a viscosity of 2,000 cps at 60° C., 11% by weight of urethane acrylate oligomer (EBECRYL 9260) having a viscosity of 2,000~4,000 cps at 60° C., 6% by weight of trimethylolpropane triacrylate and 7% by weight of methylendiol diacrylate were added to a mixture of 30% by weight of toluene, 15% by weight of methyl isobutyl ketone, 5% by weight of ethyl acetate and 5% by weight of ethyl cellosolve while stirring. Then, 5% by weight of DAROCUR 1173 as a photoinitiator and 1% by weight of BYK-333 (BYK chemie) as a leveling agent were added thereto, and the resulting mixture was stirred for 30 min to obtain an UV-curable coating composition (non-volatile content, 45 wt %). Here, the percentage values are based on the weight of the final composition.

Preparation of Coating Films

Examples 5 to 8

The high-solid UV-curable coating compositions obtained in Examples 1 to 4 were each coated on a polycarbonate substrate coated with a UVP primer (for a UV-curable top coat) by spray coating, which was subject to drying at room temperature (25° C.) for 1 to 2 min to remove a trace amount of residual organic solvent: The dried coated substrate was cured twice at a line speed of 10/min and a light intensity of 300 mJ/cm$^2$ with a fusion lamp (Fusion System Co.) to prepare a 15~17 μm, 20~22 μm, 20~25 μm, 25~27 μm, 30~33 μm, 35~38 μm and 40~45 μm thick coating film.

Comparative Example 2

The procedure of Examples 5 to 8 was repeated except for using the UV-curable coating composition obtained in Comparative Example 1 and drying at 60° C. for 1 to 2 min to remove the residual organic solvent, to prepare coating films.

Assay of Film Properties

Experimental Example 1

The physical and chemical characteristics of 20~25 μm coating films obtained in Examples 5 to 8 and Comparative Example 2 were evaluated in accordance with the following methods.

(1) Adhesion Property: ASTM D3359-87

A coating film was cut in a checkered pattern at 1 mm intervals to form 100 1 mm×1 mm squares. An adhesive test tape was firmly attached to the formed pattern and removed at an angle of 180 degrees by a sharp peeling motion, which was repeated three times. The state of the pattern was examined and the results were evaluated according to the following criteria:

5B: peeling at the cut edge or within the patterned area is absent

4B: slight peeling at the cut edge—the area peeled is less than 5% of the patterned area 3B: some peeling and breakage at the cut edge—the area peeled is less than 15% of the patterned area 2B: considerable peeling and breakage at the cut edge and within the patterned area—the area peeled is less than 35% of the patterned area 1B: extensive ribbon-type peeling—the area peeled is in the range from 35 to 65% of the pattern area 0B: poor adhesiveness—the area peeled is more than 65% of the patterned area (2) Pencil Hardness: ASTM D3363-74

A test coating film was scratched with a pencil of varying hardness under a constant pressure at an angle of 45 degrees, which was repeated five times. The hardness value of the pencil produced only one scratch or breakage of the coating layer is referred to as the pencil hardness.

(3) Gloss

The gloss value of a test coating film was measured at light acceptance and incident angles of 60 degrees with a BYK-GARDNER glossmeter, and the result obtained was expressed as a percentage value based on the gloss value of the base plane of 100.

(4) Abrasion Resistance

The surface of a test coating film was rubbed with an eraser under a 500 g-load at a rate of 40 times/min. The state of the resulting material was examined with the naked eye.

(5) Chemical Resistance

The surface of a coating film was dipped in 99.3% methanol, followed by rubbing with an eraser under a 500 g-load at a rate of 40 times/min. The state of the resulting material was examined with the naked eye.

(6) Moisture Resistance

The degree of aspect deformation and adhesion property were tested after exposing a test specimen to a condition of 50° C. and 95% relative humidity for 72 hours.

(7) Acid Resistance

The degree of aspect deformation and adhesion property were tested after treating a test specimen with a standard pH 4.6 solution for 72 hours.

(8) UV Test (QUV)

The degree of aspect deformation and adhesion property were tested after keeping a test specimen for 72 hours in a UV tester (QUV, Q-Pannel).

The physical properties of the coating films thus measured are showed in Table 1.

TABLE 1

|  | Example 5 | Example 6 | Example 7 | Example 8 | Comparative Example 2 |
|---|---|---|---|---|---|
| Nonvolatile content of coating composition(%) | 90 | 91.5 | 91.5 | 91.5 | 45 |
| Adhesion property | 5B | 5B | 5B | 5B | 5B |
| Pencil hardness | H | H | H | HB | HB |
| Gloss(60°) | 135 | 134 | 136 | 134 | 124 |
| Abrasion resistance | ⊚ | ⊚ | ⊚ | ⊚ | ○ |
| Chemical resistance | ⊚ | ⊚ | ⊚ | ⊚ | ○ |
| Moisture resistance | ⊚ | ⊚ | ⊚ | ⊚ | ⊚ |
| Acid Resistance | ⊚ | ⊚ | ⊚ | ⊚ | ○ |
| UV Test | 2.63 | 2.73 | 2.67 | 3.21 | 2.78 |

⊚; excellent,
○; good

As shown in Table 1, the coating films obtained using the inventive compositions exhibit improved characteristics in terms of adhesion property, pencil hardness, gloss, abrasion resistance, chemical resistance, moisture resistance and acid resistance, as compared to those obtained using conventional compositions.

Experimental Example 2

The adhesion property and thermal shock resistance of the coating films obtained in Examples 5 to 8 and Comparative Example 2 were evaluated and the results are showed in Table 2.

The thermal shock resistance was evaluated in accordance with the following methods.

A test coating film was kept for 2 hours at 85° C. and breaking or cracking was examined with the naked eye and the results were evaluated according to the following criteria:

A: no breaking or cracking on the external surface of the film
B: about 1 to 2 crackings on the external surface of the film
C: more than 3 crackings on the external surface of the film

TABLE 2

|  | Example 5 | | Example 6 | | Example 7 | | Example 8 | | Comparative Example 2 | |
|---|---|---|---|---|---|---|---|---|---|---|
| thickness of coating film(μm) | Adhesion property | Thermal shock resistance | Adhesion property | Thermal shock resistance | Adhesion property | Thermal shock resistance | Adhesion property | Thermal shock resistance | Adhesion property | Thermal shock resistance |
| 15~17 | 5B | A | 5B | A | 5B | A | 5B | A | 5B | A |
| 20~22 | 5B | A | 5B | A | 5B | A | 5B | A | 5B | A |
| 25~27 | 5B | A | 5B | A | 5B | A | 5B | A | 5B | A |
| 30~33 | 5B | A | 5B | A | 5B | A | 5B | A | 5B | A |
| 35~38 | 5B | A | 5B | A | 5B | A | 5B | A | 5B | A |
| 40~45 | 5B | A | 5B | A | 5B | A | 5B | B | 4B | B |

As shown in Table 2, the high-solid UV-curable coating compositions according to the invention exhibit improved adhesion property and thermal shock resistance at the various thickness, particularly even at a high thickness of 40 to 45 μm.

While the invention has been described with respect to the above specific embodiments, it should be recognized that various modifications and changes may be made to the invention by those skilled in the art which also fall within the scope of the invention as defined by the appended claims.

What is claimed is:

1. A ultraviolet (UV) curable coating composition comprising (A) 20 to 60% by weight of a urethane acrylate oligomer, (B) 20 to 60% by weight of a ultraviolet (UV) curable monomer, (C) 1 to 10% by weight of an organic solvent, and (D) 1 to 10% by weight of a photoinitiator based on the total weight of the composition, wherein the urethane acrylate oligomer has 6 to 9 functional acrylate groups and exhibits a viscosity of 500 to 30,000 cps (centipoise) at room temperature wherein the urethane acrylate oligomer is prepared by reacting a polyisocyanate compound having three or more isocyanate groups with an acrylate compound having one or more hydroxyl groups and three or more acryl groups in the presence of a metallic catalyst and a radical polymerization inhibitor and wherein the acylate compound is a mixture of pentaerythritol triacrylate and pentaerythritol tetraacrylate, or a mixture of dipentaerythritol pentaacrylate and dipentaerythritol hexaacrylate.

2. The ultraviolet (UV) curable coating composition of claim 1, wherein the polyisocyanate compound is selected from the group consisting of 1,6-hexamethylene diisocyanate trimer, 1,6-hexamethylene diisocyanate biuret and 1,6-hexamethylene diisocyanate allophanate.

3. The ultraviolet (UV) curable coating composition of claim 1, wherein the acrylate compound is a mixture of 50 to 60% by weight of pentaerythritol triacrylate and 40 to 50% by weight of pentaerythritol tetraacrylate.

4. The ultraviolet (UV) curable coating composition of claim 1, wherein the urethane acrylate oligomer (A) comprises 30% by weight or less of a diluent.

5. The ultraviolet (UV) curable coating composition of claim 4, wherein the diluent is an organic solvent, or a non-reactive ultraviolet (UV) curable monomer having no hydroxy group.

6. The ultraviolet (UV) curable coating composition of claim 1, wherein the ultraviolet (UV) curable monomer (B) is selected from the group consisting of pentaerythritol tri/tetraacrylate(PETA), trimethylolpropane triacrylate(TMPTA), hexamethylene diacrylate(HDDA), 2-hydroxyethyl acrylate (2-HEA), 2-hydroxypropyl acrylate(2-HPA), 2-hydroxy acrylate(2-HBA), isobornyl acrylate(IBOA) and a mixture thereof.

7. The ultraviolet (UV) curable coating composition of claim 1, wherein the organic solvent (C) is selected from the group consisting of methyl isobutyl ketone, methyl ethyl ketone, dimethyl ketone, isopropyl alcohol, isobutyl alcohol, normal butyl alcohol, ethyl acetate, normal butyl acetate, ethyl cellosolve, butyl cellosolve and a mixture thereof.

8. A method for preparing a coating film comprising spray coating, dip coating, flow coating or spin coating the composition according to any one of claims 1, 2, 3, 4, 5, 6, or 7 on the surface of a substrate to form a UV-curable film thereon, drying the ultraviolet (UV) curable film at room temperature, and curing the dried film by ultraviolet (UV) irradiation.

9. The method of claim 8, wherein the substrate is a plastic.

10. A coating film prepared by the method of claim 8.

11. A product comprising the coating film of claim 10.

12. The product of claim 11 which is a mobile phone, automobile or electronic appliance.

* * * * *